US011328461B2

(12) United States Patent
Furger et al.

(10) Patent No.: US 11,328,461 B2
(45) Date of Patent: May 10, 2022

(54) GNSS-BASED MAP GENERATION

(71) Applicant: SAFEMINE AG, Zug (CH)

(72) Inventors: Fabian Ismael Furger, Baar (CH); Johannes Huber, Walchwil (CH)

(73) Assignee: SAFEMINE AG, Zug (CH)

( * ) Notice: Subject to any disclaimer, the term of this patent is extended or adjusted under 35 U.S.C. 154(b) by 274 days.

(21) Appl. No.: 16/844,853

(22) Filed: Apr. 9, 2020

(65) Prior Publication Data
US 2020/0327707 A1    Oct. 15, 2020

(30) Foreign Application Priority Data

Apr. 10, 2019 (EP) ..................................... 19168545

(51) Int. Cl.
*G06T 11/20* (2006.01)
*G01S 19/51* (2010.01)

(52) U.S. Cl.
CPC .............. *G06T 11/20* (2013.01); *G01S 19/51* (2013.01)

(58) Field of Classification Search
CPC ..... G06T 11/20; G01S 19/51; G01C 21/3841; G01C 21/3881; G01C 21/32; G09B 29/004; G09B 29/12
See application file for complete search history.

(56) References Cited

U.S. PATENT DOCUMENTS

| 8,958,979 B1* | 2/2015 | Levine .................. G01C 21/32 340/988 |
| 2016/0102986 A1 | 4/2016 | Ma et al. |
| 2016/0335923 A1 | 11/2016 | Hofmann et al. |
| 2017/0336215 A1 | 11/2017 | Racz |

OTHER PUBLICATIONS

European Search Report in EP application No. 19168545.2 dated Oct. 11, 2019.
Jang et al. "Map generation system with lightweight GPS trace data" International Conference on Advanced Communication Technology, ICACT, 2010, vol. 2, pp. 1489-1493.

* cited by examiner

*Primary Examiner* — William A Beutel
(74) *Attorney, Agent, or Firm* — Maschoff Brennan

(57) ABSTRACT

Automatic generation of a road map of a site can be performed. Data records collected by vehicles with a GNSS-positioning system while driving are provided, each data record having a position information representing a two-dimensional or three-dimensional position of the vehicle, an identification reference specific to a corresponding vehicle, a time tag, and a heading information. The data records are assigned to corresponding trips based on the time tag and the identification reference. The trips are mapped within an area and the area is divided into a plurality of uniform tiles. For each tile, a heading information variance of the data records covered by the respective tile is determined. A tile is defined as junction tile, if the tile has a heading information variance higher than a computed threshold variance. An area of interest (AoI) having a perimeter is determined by which a plurality of junction tiles is surrounded.

18 Claims, 4 Drawing Sheets

GNSS-BASED MAP GENERATION

CROSS-REFERENCE TO RELATED APPLICATIONS

This application claims priority to European Patent Application No. 19168545.2 filed on Apr. 10, 2019, which is incorporated herein by reference.

FIELD OF THE INVENTION

The present invention relates to a method for an automatic generation of a road map of a construction site or mining site.

BACKGROUND OF THE INVENTION

Junctions are an essential part of road networks which is why the present method is focused on the detection of junctions and on establishing the connections among them. A special challenge in building a map for construction site roads or mining site roads is the fact that crossroads areas (junctions) are very often not rectangular in contrast to regular automobile roads. Accordingly, known approaches for map generations of regular roads cannot be applied to construction sites or mining sites as such approaches use a junction detection based on heading change and speed change. Many junctions in construction and mining environments have fluent road passages and there are several other reasons for driving slowly besides junctions. Also, on construction and mining sites, there are often special areas with a lot of traffic but actually no streets.

Other approaches take advantage of the existence of pairwise trips diverging or converging, but such approaches are also not feasible in the mine or construction context, since the roads and especially individual lanes are wider and less clearly defined compared to an urban environment. Furthermore, the frequency of irregular driving behaviour and frequency of road network change on construction and mining sites render such approaches impractical.

SUMMARY OF THE INVENTION

In some embodiments, the invention provides a method for an automatic generation of a road map that overcomes the special challenges of a road network of construction sites or mining sites. A method according to the invention allows for a more robust and reliable map generation.

In some embodiments, the invention relates to a method for an automatic generation of a road map of a construction site or mining site, the method comprising the steps: providing data records collected by vehicles equipped with a GNSS-positioning system while driving on the construction site or mining site, each data record comprising a position information representing a two-dimensional or three-dimensional position of the vehicle, an identification reference specific to a corresponding vehicle, a time tag, and a heading information, assigning the data records to corresponding trips based on the time tag and the identification reference, mapping the trips within an area, dividing the area into a plurality of uniform tiles, for each tile, determining a heading information variance of the data records covered by the respective tile, defining a tile as junction tile, if the tile has a heading information variance higher than a computed threshold variance, determining an area of interest (AoI) having a perimeter by which a plurality of junction tiles is surrounded, the perimeter crossing a plurality of trips at entry boundary points and at exit boundary points, determining one or more entry transition points by clustering entry boundary points based on a similarity criterion, wherein each entry transition point is located at a centroid of the respective cluster, determining one or more exit transition points by clustering exit boundary points based on the similarity criterion, wherein each exit transition point is located at a centroid of the respective cluster, building a graph of the road map by connecting the transition points based on the trips.

The similarity criterion may be based on an angle at which the respective trip is crossing the perimeter of the AoI.

In some embodiments, the method may further comprise removing unwanted data records, wherein such unwanted data records are data records that meet at least one of the following criteria: (a) a course information indicates a reversing of the vehicle, (b) a length of a trip is below a threshold trip length, (c) the GNSS signal quality attribute is dissatisfying a minimum requirement, and (d) the speed information and the heading information are both within respective threshold ranges surrounding a speed information and a heading information of an (temporally) adjacent data record.

Each data record may further comprise at least one of: a course information, a speed information, a GNSS signal quality attribute, and a measurement accuracy attribute.

A course information is conceptually similar with the heading information but is concerned with the vehicle's direction as opposed to a movement direction. Thus, reverse driving can be observed with the course information, but usually not with the heading information.

For mapping the trips within an area, the data records, in particular the position information, may be transformed from a global reference system (latitude, longitude, in angles) into a local reference system (East, North, in meter).

Each trip preferably has a length greater than a minimum length, wherein at least one of the following criteria is met: (a) consecutive data records of each trip are spaced by a distance below a maximum distance, and (b) time intervals between consecutive data records of each trip are below a maximum duration.

The defining of a tile as junction tile is preferably performed, if the tile comprises an amount of data records higher than a threshold amount.

In some embodiments, the method may further comprise transforming each heading information by applying modulo 180 to the respective heading information. This step removes the directedness of the roads.

In some embodiments, the method may further comprise subtracting a computed offset from each transformed heading information such that no offset heading information falls near the 179-0-degree boundary, in particular further applying modulo 180 to the transformed and offset heading information. This latter step makes sure that the resulting heading information are between 0 and 180.

As an alternative to the modulo 180 steps mentioned above, the method may comprise a step of transforming each heading information based on a circular statistics method.

Tiles may be classified in a grid as belonging to a junction or not depending on a driving behaviour of the vehicle within the tile.

The AoI may comprise a defined buffer area between the perimeter and the plurality of junction tiles. The AoI may mark in this way the plurality of junction tiles, but with the buffer area acting as a "safety factor".

The data records collected by vehicles equipped with a GNSS-positioning system while driving on the construction site or mining site are specifically provided with a high temporal resolution. For example, the frequency of the data record collection is about 1 Hz.

The centroids of the clusters may be determined based on a k-means algorithm.

A size of a perimeter segment considered for clustering the boundary points may be increased, which results in a decreasing number of transition points, until predetermined criteria are met.

In case a distance between two clusters or transition points is smaller than a threshold distance, said two clusters or transition points may be merged to form one cluster.

The number of transition points may be optimised based on predetermined criteria, and the location of the transition points on the perimeter may be subject to k-means clustering.

The method may further comprise, within each AoI, connecting each entry transition point with a corresponding exit transition point based on the corresponding trips, and defining certain AoI as a non-junction area based on the connected transition points.

The method may further comprise, for each defined non-junction area, determining a corresponding type of special area based on an arrangement of the transition points. The special area may be e.g. one of a dead-end road, a turning area, a dumping area, or a loading station.

The method may further comprise determining road widths based on the trips, in particular based on a scattering of the trips, and augmenting the graph of the road map with the determined road widths.

In some embodiments, the invention also relates to a system, which in particular is a system for an automatic generation of a road map of a construction site or mining site, the system comprising a computer and a plurality of GNSS-positioning systems, each GNSS-positioning system being equipment of a vehicle intended for driving on construction site or mining site and being configured for collecting data records, each data record comprising a position information representing a two-dimensional or three-dimensional position of the vehicle, an identification reference specific to a corresponding vehicle, a time tag, and a heading information, the computer configured for receiving the data records, assigning the data records to corresponding trips based on the time tag and the identification reference, mapping the trips within an area, dividing the area into a plurality of uniform tiles, for each tile, determining a heading information variance of the data records covered by the respective tile, defining a tile as junction tile, if the tile has a heading information variance higher than a computed threshold variance, determining an area of interest (AoI) having a perimeter by which a plurality of junction tiles is surrounded, the perimeter crossing a plurality of trips at entry boundary points and at exit boundary points, determining one or more entry transition points by clustering entry boundary points based on a similarity criterion, wherein each entry transition point is located at a centroid of the respective cluster, determining one or more exit transition points by clustering exit boundary points based on the similarity criterion, wherein each exit transition point is located at a centroid of the respective cluster, building a graph of the road map by connecting the transition points based on the trips.

In some embodiments, said computer comprises a processor and a tangible, non-transient memory in electronic communication with the processor, the memory embodying instructions, the instructions being executable by the processor, wherein the instructions are defined by the method steps of the independent method claim, in particular by any of the methods as defined by the dependent method claims.

The invention also relates to a computer program comprising computer program code for causing a computer, in particular on said computer, to implement a method as defined by the independent method claim, in particular any of the methods as defined by the dependent method claims, when the computer program is executed in the computer.

The invention also relates to a computer program product comprising a tangible, non-transient data storage medium which can be read by a computer, in particular on said computer, and on which data storage medium the program code of said computer program is stored.

BRIEF DESCRIPTION OF THE DRAWINGS

In the following, the invention will be described in detail by referring to exemplary embodiments that are accompanied by figures, in which.

DETAILED DESCRIPTION

Figure 1:
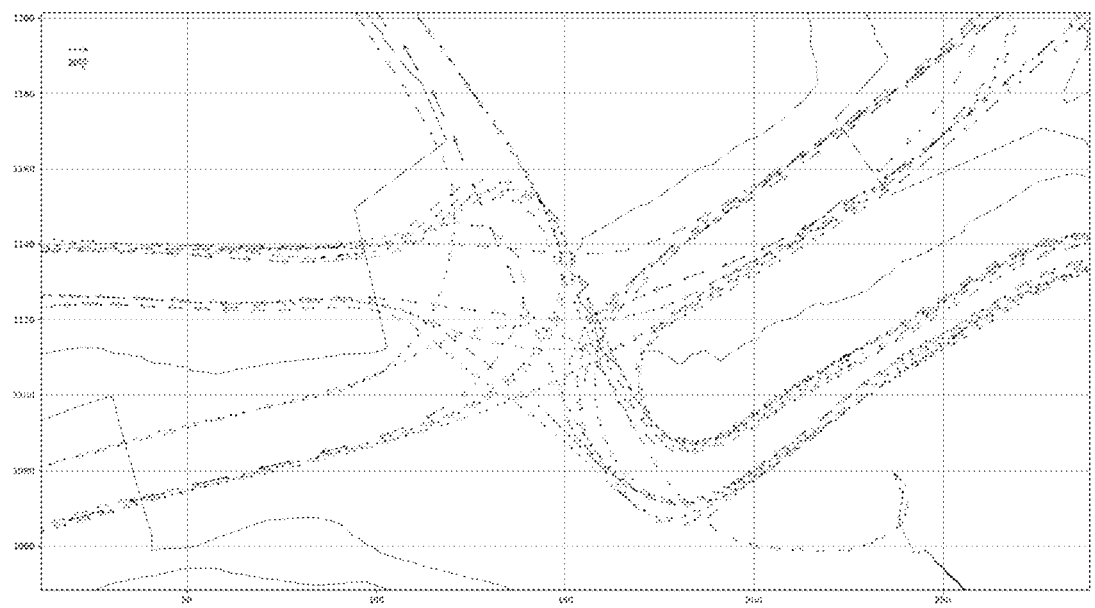
FIG. 1: shows position, speed, and heading information mapped within an area.

FIG. 1 shows a visualisation of a plurality of data records which are collected by GNSS-positioning systems which are equipment of vehicles. The collecting takes place while the vehicles are driving on a construction site or a mining site. Each data record comprises at least: a position information (points in FIG. 1), which indicates the position of the vehicle at the time of the data record sampling; an identification reference, by which every data record can be assigned to a specific vehicle which samples the data records; a time tag, indicative for the time at which this specific data record was sampled; a heading information (arrows in FIG. 1), which represent a current heading of the vehicle at the time of the sampling. By their lengths and opaqueness, the arrows in FIG. 1 further represent the speed information of the vehicles.

The data records can be collected on the GNSS-positioning systems and be afterwards (e.g. at the end of each day) sent to the computer for processing them. Alternatively, the data records could be sent to the computer in real-time, e.g. by means of a transmission device comprised by or connected to the GNSS-positioning system.

The steps described in the following take place on the computer. The computer may further comprise or be connected to a display for outputting a graphical user interface (GUI) showing what is shown in the figures. In particular, at least the graph as output by the method is interpretable to be displayed on any display.

Figure 2:
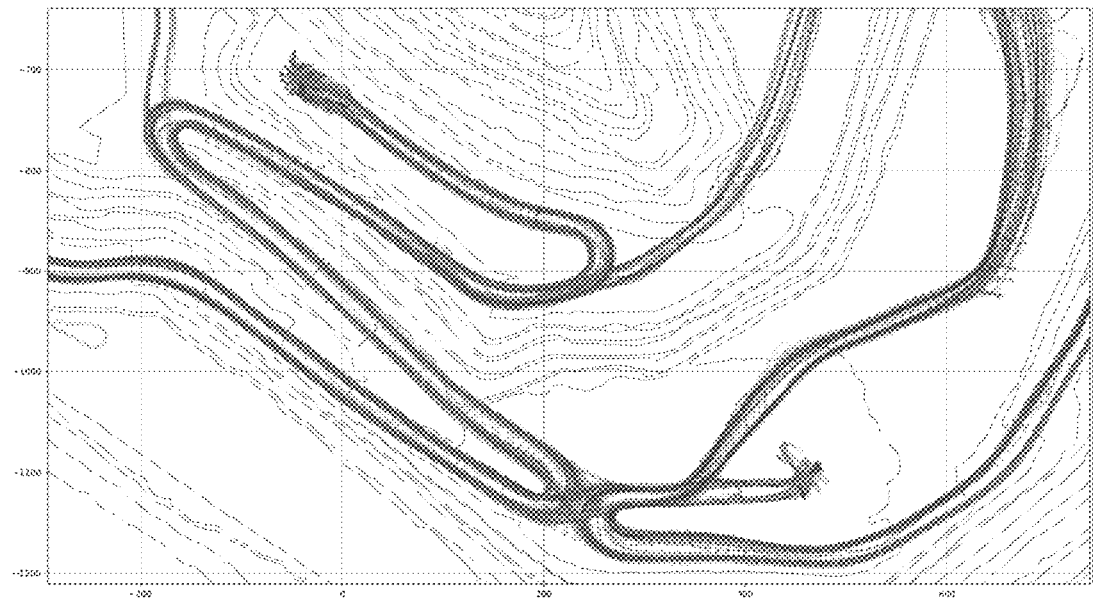
FIG. 2: shows a plurality of trips mapped within an area.

FIG. 2 shows a plurality of trips being mapped within an area. The trips are combined data records which were found to belong together based on the identification reference, in particular further based on the corresponding time tag.

Figure 3:
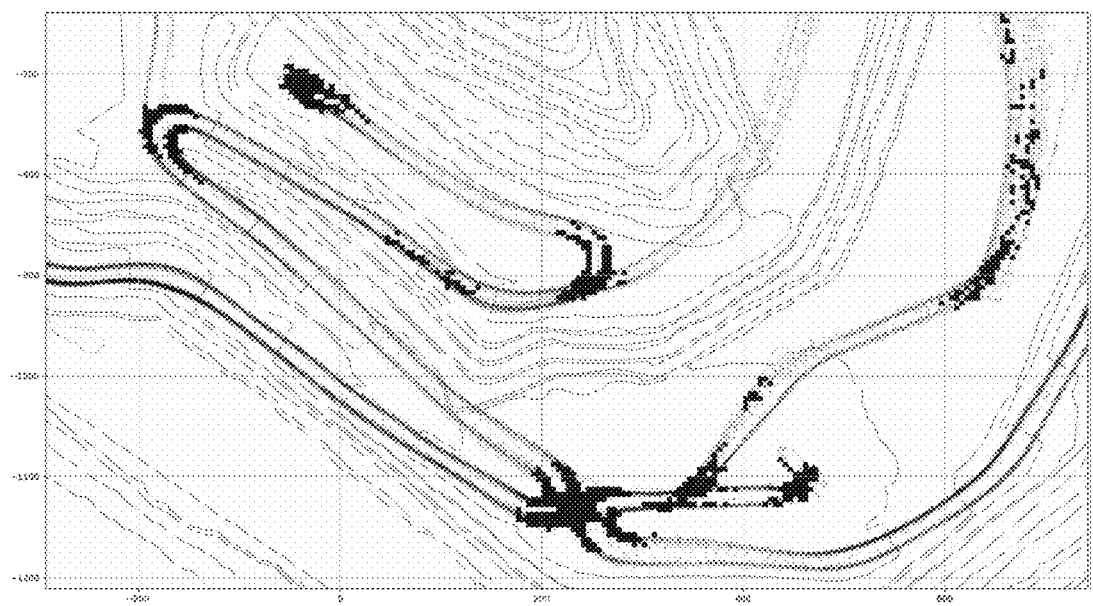
FIG. 3: shows markings of detected junction tiles in the area of FIG. 2.

FIG. 3 shows the area with tiles that are marked (dark) as junction tiles. It is decided by the computer if a tile is a junction tile based on the heading information of the data records covered by the tile. For each tile, a variance of the transformed heading information of the regarding data records is determined, and in case the determined variance is higher than a threshold variance, the tile is defined as a junction tile. In particular, the threshold may be predetermined or be calculated by a predetermined percentile.

Figure 4:
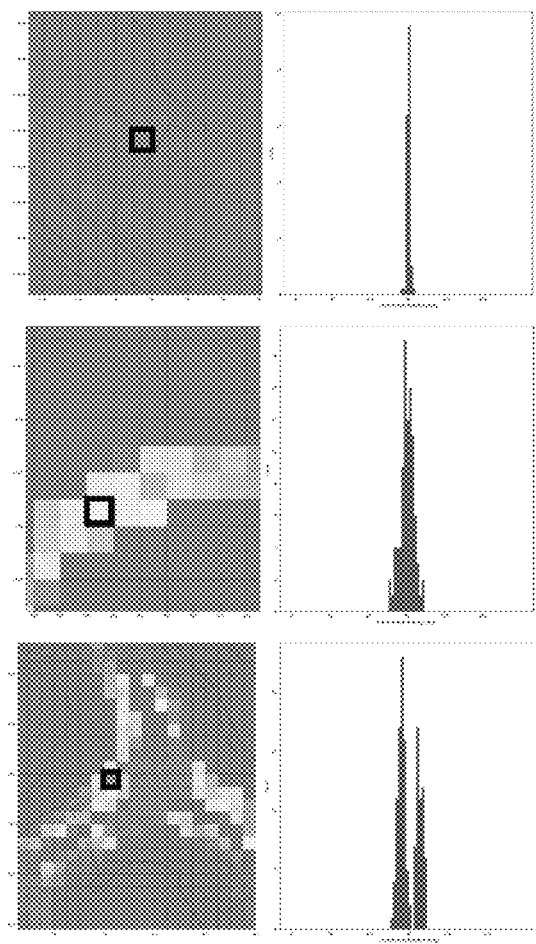
FIG. 4: shows several evaluations of tiles with respect to the variance of transformed heading information.

FIG. 4 shows three exemplary analyses of a selection of tiles with regard to a transformed heading information variance. In each case, an assessment of a tile selected in the area section is shown in form of a histogram, wherein the histogram is indicating a variance of the transformed heading information in the analysed tile.

The first histogram (top) shows a low variance because the bandwidth of different headings occurring in the tile is rather narrow. This first selected tile lays on a straightaway which explains the low variance. The analysis of the second tile (middle) results in wider distributed headings. The selected tile in the second area section is located on a curve, which is why the variance is higher than in the selected tile of the first area section but not high enough to for exceeding a predetermined threshold value. In contrast to the first and second example, the tile selected and analysed in the third area section (bottom) covers indeed part of an intersection and therefore has a high variance. Because of the high variance exceeding the threshold value, this tile is consequently deemed to cover data records that where collected in a junction area. The two driving directions can be clearly distinguished in the adjacent histogram.

Figure 5:
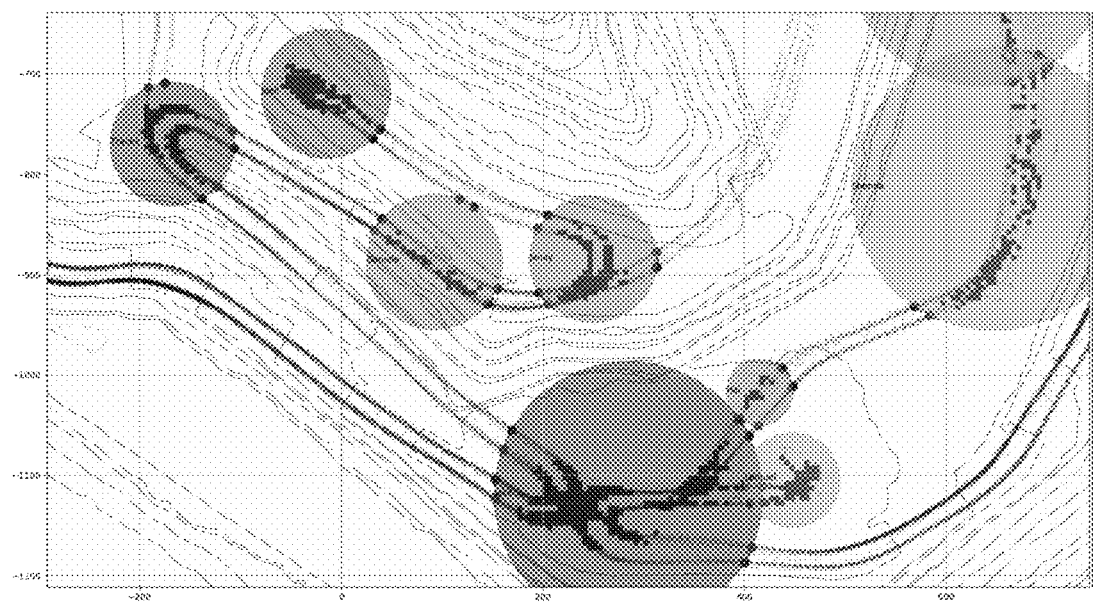
FIG. 5: shows Areas of Interest (AoI) encompassing junction tiles and therewith marking potential junction areas.

FIG. 5 shows the area of FIG. 3, wherein Areas of Interest (AoI) are encircling a plurality of tiles that have been defined as junction tiles. The AoI are circular only by way of example and could indeed have any other shape. A perimeter of the AoI surrounds a plurality of junction tiles, in particular wherein the plurality of surrounded junction tiles may be subject to predetermined criteria with regard to amount and/or arrangement. Such adjustments (the criteria) may be advantageous for achieving a sensible selection of AoI.

Each AoI has a perimeter that is crossing trips, and each of such crossing points is a boundary point. Based on whether the trip is, at the respective boundary point, leading into or out of the AoI, there are entry boundary points and exit boundary points respectively.

Figure 6:
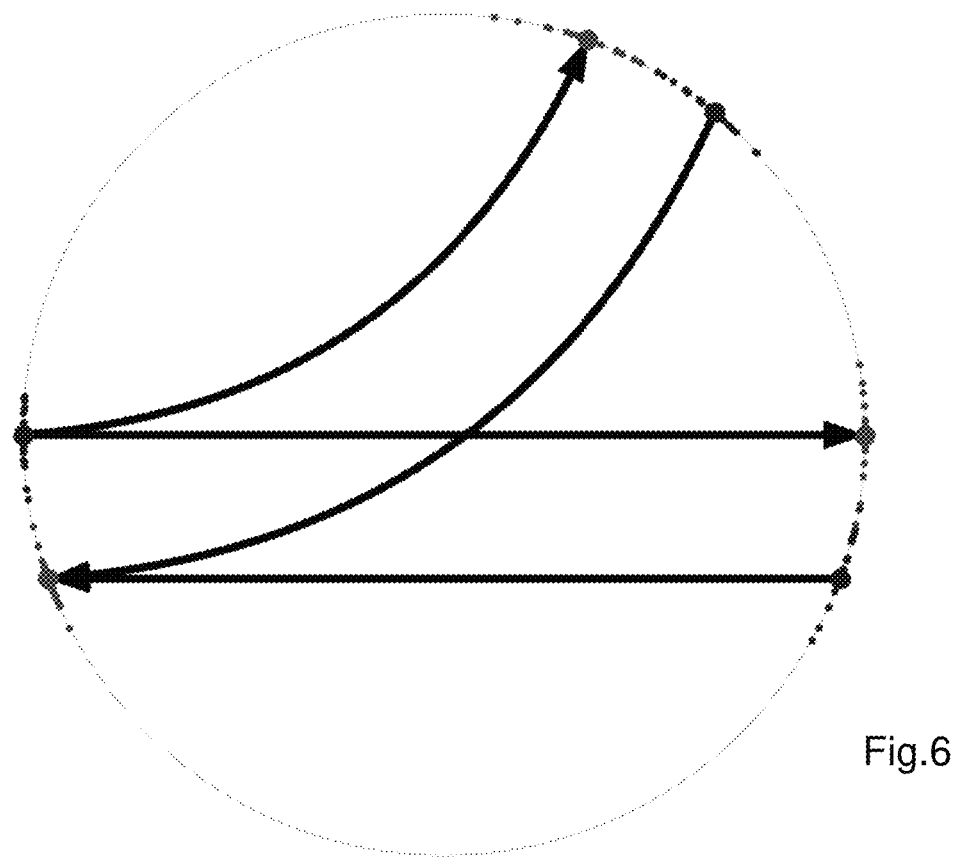
FIG. 6: shows a detailed view of boundary points clustered to transition points along the perimeter of an AoI.

A clearer view of an exemplary AoI is shown in FIG. 6, wherein the AoI has three clusters of entry boundary points (at the arrow-start) and three clusters of exit boundary points (at the arrow-head). The boundary points are assigned to their respective clusters based on similarity criteria. For each cluster, a transition point is determined based on an averaging of the cluster members. The arrow pathway is defined by the trips connecting these entry and exit transition points. The transition points indicate where the road enters/exits a junction.

Figure 7:
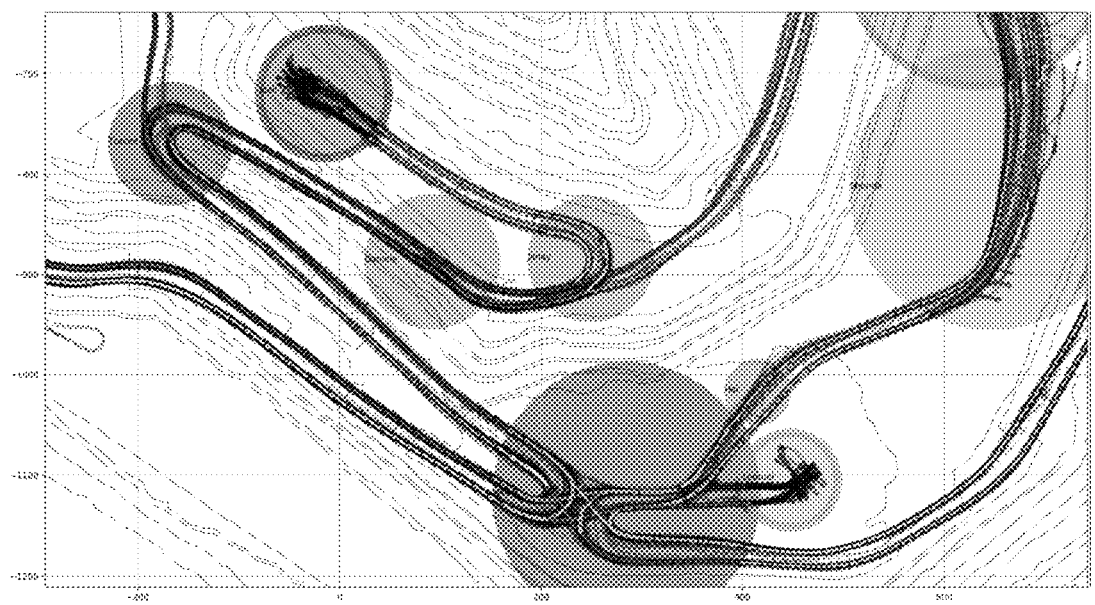
FIG. 7: shows transition points on the perimeters of the AoI being connected with each other based on the trips to build the road map.

FIG. 7 shows a built graph of the road map. The determined transition points have been connected based on the trips. For example, trips determined by checking corresponding criteria to be running on the same road are consolidated and averaged to find an assumed centre line of the road. Starting from that centre line, a determined road width could be added such as to define the road width of the road map.

Figure 8:
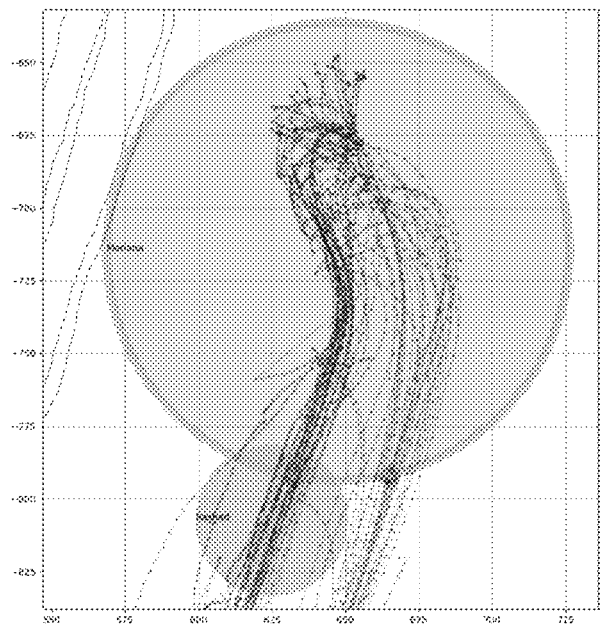
FIG. 8: shows an exemplary special area (non-junction) embodied as dead-end.

FIG. 8 shows an exemplary dead-end that is discarded from being considered a junction because the AoI (large circle) that has been detected due to the high variance of heading information only counts two clusters of entries and exits in a characteristic arrangement. Such special areas, which are not junctions, could be excluded from extending the set of roads. However, dead-end areas like the one shown in FIG. 8 may still be part of the map, e.g. being marked as a dumpsite.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A method for an automatic generation of a road map of a construction site or mining site, the method comprising the steps:
   providing data records collected by vehicles equipped with a GNSS-positioning system while driving on the construction site or mining site, each data record comprising:
      a position information representing a two-dimensional or three-dimensional position of the vehicle,
      an identification reference specific to a corresponding vehicle,
      a time tag, and
      a heading information,
   assigning the data records to corresponding trips based on the time tag and the identification reference,
   mapping the trips within an area,
   dividing the area into a plurality of uniform tiles,
   for each tile, determining a heading information variance of the data records covered by the respective tile,
   defining a tile as junction tile, if the tile has a heading information variance higher than a computed threshold variance,
   determining an area of interest (AoI) having a perimeter by which a plurality of junction tiles is surrounded, the perimeter crossing a plurality of trips at entry boundary points and at exit boundary points,
   determining one or more entry transition points by clustering entry boundary points based on a similarity criterion, wherein each entry transition point is located at a centroid of the respective cluster,
   determining one or more exit transition points by clustering exit boundary points based on the similarity criterion, wherein each exit transition point is located at a centroid of the respective cluster, and
   building a graph of the road map by connecting the transition points based on the trips.

2. The method according to claim 1, wherein the similarity criterion is based on an angle at which the respective trip is crossing the perimeter of the AoI.

3. The method according to claim 1, wherein each data record further comprises at least one of:
   a course information,
   a speed information,
   a GNSS signal quality attribute, and
   a measurement accuracy attribute.

4. The method according to claim 1, wherein each trip has a length greater than a minimum length and wherein at least one of the following criteria is met:
   consecutive data records of each trip are spaced by a distance below a maximum distance, and
   time intervals between consecutive data records of each trip are below a maximum duration.

5. The method according to claim 1, wherein defining a tile as junction tile is performed, if the tile comprises an amount of data records higher than a threshold amount.

6. The method according to claim 1, comprising:
transforming each heading information by applying modulo 180 to the respective heading information.

7. The method according to claim 6, comprising:
Subtracting a computed offset from each transformed heading information such that no offset heading information falls near an 170-0-degree boundary.

8. The method according to claim 7, further comprising applying modulo 180 to the transformed and offset heading information.

9. The method according to claim 1, comprising:
transforming each heading information based on a circular statistics method.

10. The method according to claim 1, wherein the AoI comprises a defined buffer area between the perimeter and the plurality of junction tiles.

11. The method according to claim 1, wherein the centroids of the clusters are determined based on a k-means algorithm.

12. The method according to claim 1, wherein a size of a perimeter segment considered for clustering the boundary points is increased, which results in a decreasing number of transition points, until predetermined criteria are met.

13. The method according to claim 1, wherein, in case a distance between two clusters or transition points is smaller than a threshold distance, said two clusters or transition points are merged to form one cluster.

14. The method according to claim 1, comprising:
within each AoI, connecting each entry transition point with a corresponding exit transition point based on the corresponding trips,
defining certain AoI as a non-junction area based on the connected transition points, and
for each defined non-junction area, determining a corresponding type of special area based on an arrangement of the transition points.

15. The method according to claim 14, wherein the special area is one of a dead-end road, a turning area, a dumping area, or a loading station.

16. The method according to claim 1, comprising:
determining road widths based on the trips, and
augmenting the graph of the road map with the determined road widths.

17. The method according to claim 1, comprising:
within each AoI, connecting each entry transition point with a corresponding exit transition point based on the corresponding trips, and
defining certain AoI as a non-junction area based on the connected transition points.

18. A system comprising a computer and a plurality of GNSS-positioning systems, each GNSS-positioning system being equipment of a vehicle intended for driving on construction site or mining site and being configured for:
collecting data records, each data record comprising:
a position information representing a two-dimensional or three-dimensional position of the vehicle,
an identification reference specific to a corresponding vehicle,
a time tag, and
a heading information,
the computer configured for:
receiving the data records,
assigning the data records to corresponding trips based on the time tag and the identification reference,
mapping the trips within an area,
dividing the area into a plurality of uniform tiles,
for each tile, determining a heading information variance of the data records covered by the respective tile,
defining a tile as junction tile, if the tile has a heading information variance higher than a computed threshold variance,
determining an area of interest (AoI) having a perimeter by which a plurality of junction tiles is surrounded, the perimeter crossing a plurality of trips at entry boundary points and at exit boundary points,
determining one or more entry transition points by clustering entry boundary points based on a similarity criterion, wherein each entry transition point is located at a centroid of the respective cluster,
determining one or more exit transition points by clustering exit boundary points based on the similarity criterion, wherein each exit transition point is located at a centroid of the respective cluster, and
building a graph of the road map by connecting the transition points based on the trips.

* * * * *